(12) United States Patent
Laurent

(10) Patent No.: US 8,908,300 B2
(45) Date of Patent: Dec. 9, 2014

(54) APPARATUS AND METHOD FOR CLAMPING AND HANDLING OPHTHALMIC LENSES

(75) Inventor: Christian Laurent, Verviers (BE)

(73) Assignee: Automation & Robotics S.A., Verviers (BE)

( * ) Notice: Subject to any disclaimer, the term of this patent is extended or adjusted under 35 U.S.C. 154(b) by 0 days.

(21) Appl. No.: 14/002,272

(22) PCT Filed: Feb. 17, 2012

(86) PCT No.: PCT/EP2012/052782
§ 371 (c)(1),
(2), (4) Date: Nov. 6, 2013

(87) PCT Pub. No.: WO2012/116899
PCT Pub. Date: Sep. 7, 2012

(65) Prior Publication Data
US 2014/0054834 A1 Feb. 27, 2014

Related U.S. Application Data

(60) Provisional application No. 61/448,904, filed on Mar. 3, 2011.

(30) Foreign Application Priority Data

Jul. 4, 2011 (EP) ..................................... 11172515

(51) Int. Cl.
| G02B 7/02 | (2006.01) |
| B23Q 1/64 | (2006.01) |
| B24B 13/005 | (2006.01) |
| B24B 13/00 | (2006.01) |
| B24B 9/14 | (2006.01) |
| B23Q 3/06 | (2006.01) |

(52) U.S. Cl.
CPC ................ *B23Q 3/06* (2013.01); *B24B 13/005* (2013.01); *B24B 13/00* (2013.01); *B24B 9/14* (2013.01); *B24B 9/146* (2013.01); *B24B 13/0031* (2013.01)
USPC ................ 359/811; 359/819; 269/56; 269/55

(58) Field of Classification Search
CPC ................................ B23Q 3/00; B25B 13/004
USPC ........... 269/55, 56, 86, 216, 143, 249, 43, 45; 29/559; 118/503; 451/5, 42
See application file for complete search history.

(56) References Cited

U.S. PATENT DOCUMENTS 2,207,929 A * 7/1940 Meyer .............................. 269/43
3,336,902 A * 8/1967 Upton et al. ................... 118/503

(Continued)

FOREIGN PATENT DOCUMENTS

| EP | 1 093 907 A2 | 4/2001 |
| FR | 2824293 A1 | 11/2002 |
| WO | WO 01/45896 A1 | 6/2001 |

*Primary Examiner* — Lee D Wilson
*Assistant Examiner* — Seahee Yoon
(74) *Attorney, Agent, or Firm* — Reinhart Boerner Van Deuren P.C.

(57) ABSTRACT

An apparatus for clamping and handling an ophthalmic lens (A) in one or a plurality of stations throughout a manufacturing process, comprising: a main actuator (5); a loading platform (3) on which the lens is laid down with its concave surface downwards; a grip composed of two arms (1, 2) for clamping the lens on its edge, a first arm (1) being bound to said main actuator (5) and a second arm (2) being guided so that to allow for a movement parallel to the main actuator displacement; a first means for attracting the second arm (2) towards the first arm (1) so that to close the grip onto the lens edge; a second means (8) for blocking the second arm (2) at a fixed position when the first arm (1) is moved to a rest position so that to open the grip; holding fingers (6) mounted on at least one of the first arm (1) and the second arm (2) and partly sliding along parallel grooves (4) machined in said platform (3), said grooves (4) being also parallel to the actuator displacement.

15 Claims, 5 Drawing Sheets

(56) References Cited

U.S. PATENT DOCUMENTS

Figure 1:
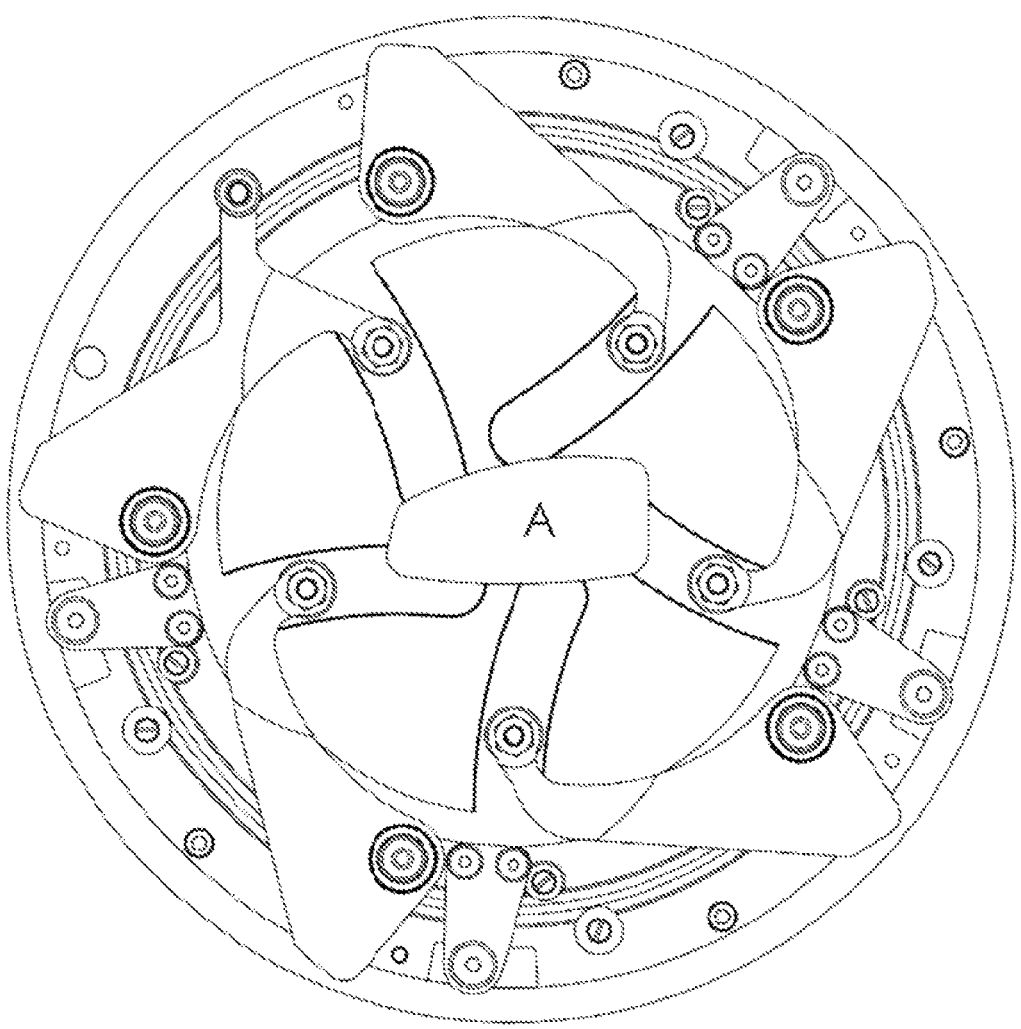

| | | | |
|---|---|---|---|
| 3,631,637 A * | 1/1972 | Tagnon | 451/390 |
| 4,096,023 A * | 6/1978 | Bivens | 156/580 |
| 5,722,647 A * | 3/1998 | Rattaro et al. | 269/45 |
| 5,988,191 A * | 11/1999 | Duncan | 134/149 |
| 6,123,604 A * | 9/2000 | Mizuno et al. | 451/42 |
| 7,090,559 B2 * | 8/2006 | Vulich et al. | 451/5 |
| 7,766,723 B2 | 8/2010 | Mazoyer | |
| 8,556,248 B2 * | 10/2013 | Velasquez et al. | 269/143 |
| 2002/0081386 A1 * | 6/2002 | Yoshida et al. | 427/401 |
| 2005/0207033 A1 * | 9/2005 | Fournand et al. | 359/819 |
| 2005/0208212 A1 * | 9/2005 | Jallouli et al. | 427/169 |
| 2013/0235482 A1 * | 9/2013 | Gehrig et al. | 359/819 |

* cited by examiner

Circular lens

Edged lens

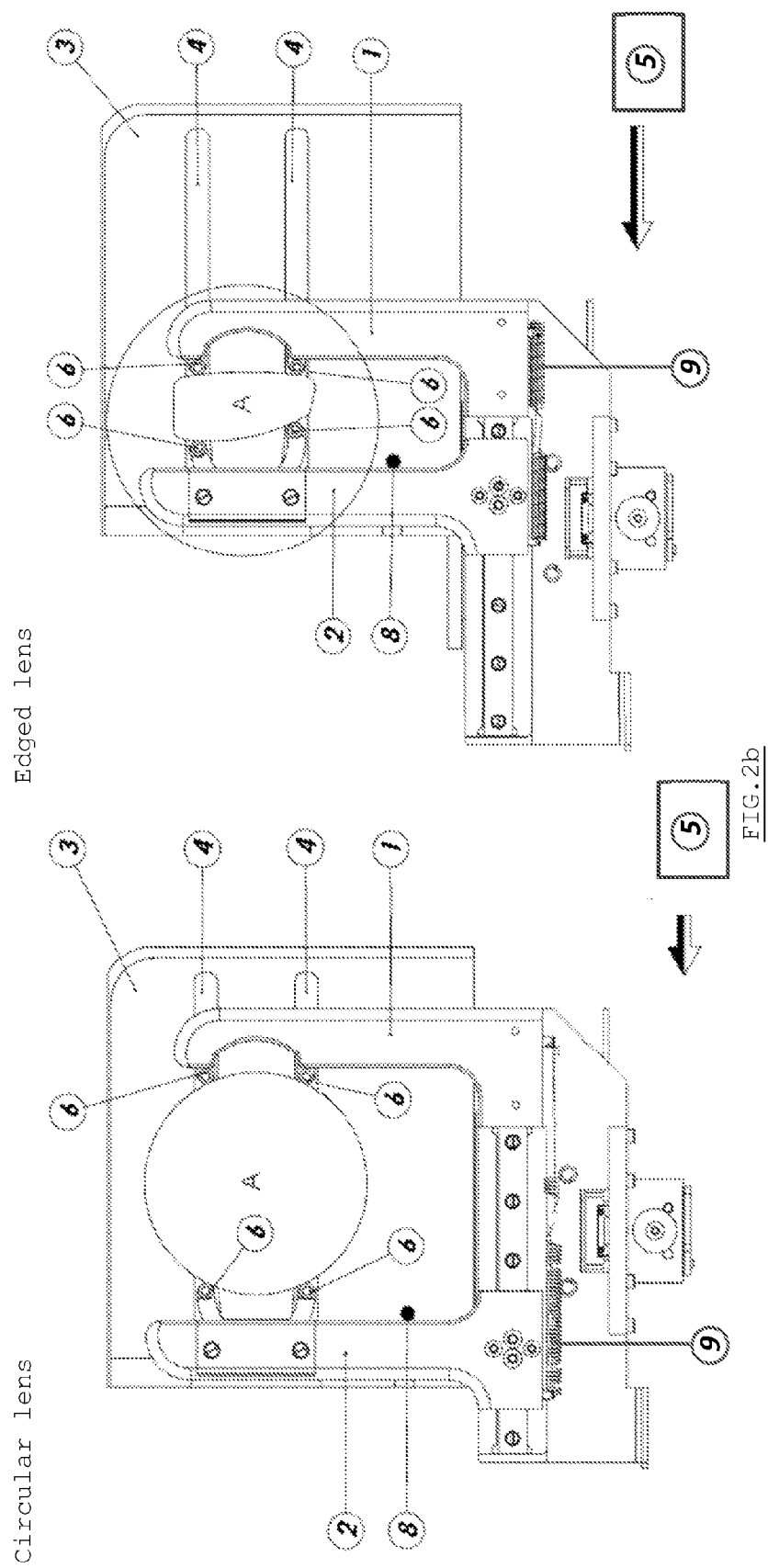

Circular lens

Edged lens

APPARATUS AND METHOD FOR CLAMPING AND HANDLING OPHTHALMIC LENSES

FIELD OF THE INVENTION

This invention relates to an apparatus and a method designed for clamping and handling ophthalmic (spectacle) lenses with a large variety of lens shapes for many operations throughout the manufacturing process. The target is to move lenses, back and forth, with at least one actuator, from a loading station to one or more functional stations.

The method is adapted to the various geometries of the ophthalmic lenses at the various steps of the manufacturing process. For the so-called semi-finished spectacle lens blanks, non edged (or uncut) finished lenses and edged lenses, one has to deal with:
- a large variety of lens shapes that can be either circular, or more complex like the shape of edged lenses ready for being mounted in the frame;
- various diameter values generally between 15 mm and 85 mm;
- various edge thickness values generally between 0 mm ('knife edge') and 25 mm;
- various center thickness values generally between 0.5 mm and 22 mm;
- various 'front' surface contours that can be spherical, toric, or more complex with an anisotropic curvature varying in a continuous or discontinuous way on a continuous or non continuous surface ('segment' of a multifocal lens), the front surface being generally convex;
- various 'back' surface contours that can be spherical, toric, or more complex with an anisotropic curvature varying in a continuous or discontinuous way on a continuous surface, the back surface being generally concave.

PRIOR ART

Many systems used for lens clamping in a grip are complex. Such systems, as shown e.g. in FIG. 1, may comprise the steps of putting the lens onto a platform with complex grooves or cuttings (for the grip fingers), moving the platform upwards with an actuator into an open complex grip, closing the grip onto the lens with at least one actuator, moving the platform downwards, and finally moving the closed grip with the lens using another actuator.

The complexity of the configuration of the platform (simple plate, e.g. EP 1 093 907) and grip is sometimes somehow reduced with drawbacks like difficulty of gripping complex lens shapes or 'knife edge' lenses. The complexity of the configuration of the platform and grip is sometimes further reduced, using a fixed glass plate as a (transparent) platform allowing for visualization, and some optical measurement of or through the surfaces, but with problems linked to the optical effect of the glass plate and the bad aspect of the platform after wearing, still keeping the drawback regarding the difficulty of gripping complex lens shapes or 'knife edge' lenses.

Alternative methods use classical vacuum suction cups mounted on a glass plate to hold the lens concave surface (i.e. FR 2 824 293), with the drawbacks linked to the contact with the surface, the masking of a surface area and other problems mentioned above with the glass plate.

Aims of the Invention

The apparatus and method as described here aim to avoid the drawbacks of prior art. In particular, the present invention aims at solving the problem of clamping and handling the lenses using a single actuator for clamping and moving the lens in one direction, taking into account the following requirements:
- no contact with the surfaces sensitive to scratches, . . . ;
- possibility to hold the various lens shapes and knife edges;
- freeing the lens surfaces for visualization, measurement of convex and concave surfaces, and various operation like surface printing, engraving, . . . ;
- supporting the lens in reaction to the pressure applied on the convex surface during pad printing and finish blocking operations;
- freeing most part of the lens edges (only local contact is allowed during edge measurements).

SUMMARY OF THE INVENTION

A first object of the present invention is an apparatus for clamping and handling an ophthalmic lens having an edge, a convex and a concave surface, in one or a plurality of stations throughout a manufacturing process, comprising:
- a main actuator;
- a loading platform on which the lens is laid down with its concave surface downwards;
- a grip composed of two arms for clamping the lens on its edge, a first arm being bound to said main actuator and a second arm being guided so that to allow for a movement parallel to the main actuator displacement;
- a first means for attracting the second arm towards the first arm so that to close the grip onto the lens edge;
- a second means for blocking the second arm at a fixed position when the first arm is moved to a rest position so that to open the grip;
- holding fingers mounted on at least one of the first arm and the second arm and partly sliding along parallel grooves in said platform, said grooves being also parallel to the actuator displacement.

According to preferred embodiments, the apparatus of the invention further comprises one or a suitable combination of the following characteristics:
- the main actuator is moving horizontally, the loading platform (3) being horizontal as well;
- the main actuator is moving in an inclined direction, the loading platform being inclined as well;
- one of the first and second arms is equipped with one or two fixed finger and the other arm is equipped with a pair of fingers, either fixed or moving with low friction according to their arm in opposite directions;
- the apparatus comprises an actuator for moving the lens in the closed grip from a station to another;
- said actuator is the main actuator;
- the two fingers moving according to their arm in opposite directions are fixed on a chord of a circle freely rotating around a rotation centre in a fixed position according to the arm;
- the first means for attracting the second arm towards the first arm so that to close the grip onto the lens is a spring;
- the apparatus comprises means for supporting the gripped lens above its loading platform via the edges of the lens concave surface in reaction to a pressure applied on the lens convex surface;
- one or more treatment stations are equipped with a platform similar to the loading platform in order to support the lens concave surface in reaction to a pressure applied on the convex surface during specific operation in the station;

the apparatus comprises additional actuators to move the lens in the closed grip onto the main actuator, or to move the main actuator itself.

Another object of the present invention is a method for moving, clamping and handling an ophthalmic lens from a loading or functional station to another functional station or vice versa, using the apparatus as above, comprising at least the following steps:

- loading a lens onto the platform of a loading station in a rest position;
- clamping the lens by pushing the lens thanks to at least one finger of the first arm in one direction, while the lens is pushing at least one finger of the second arm, till said at least one finger of the second arm gets into firm contact with the lens, closing the grip;
- moving the clamped lens back and forth from the loading station to one or more functional stations or vice versa;
- returning to the loading station, unclamping the lens in a rest position and unloading the lens from the platform in its rest position.

According to preferred embodiments, the method of the invention further comprises one or a suitable combination of the following characteristics:

- the method comprises the step of clamping the lens by pushing the lens thanks to fixed fingers of the first arm in one direction, while the lens is pushing a first mobile finger of the second arm in the same direction, leading to a movement of a second mobile finger of the second arm in the opposite direction, till both mobile fingers of the second arm get into firm contact with the lens, closing the grip;
- the two mobile fingers are on the first arm and the fixed fingers are on the second arm, ceteris paribus;
- the lens is a semi-finished spectacle lens blank, a non-edged finished lens or an edged lens;
- the lens diameter is comprised between 10 and 100 mm, the lens edge thickness is comprised between 0 and 30 mm and the lens centre thickness is comprised between 0.5 and 30 mm;
- the lens has a convex front surface and a concave back surface, said surfaces being spherical, toric or having a form corresponding to an anisotropic curvature varying in a continuous or discontinuous way on a continuous or non continuous surface.

SHORT DESCRIPTION OF THE DRAWINGS

FIG. 1 represents an example of a system for lens clamping in a grip according to prior art.

Figure 2A:
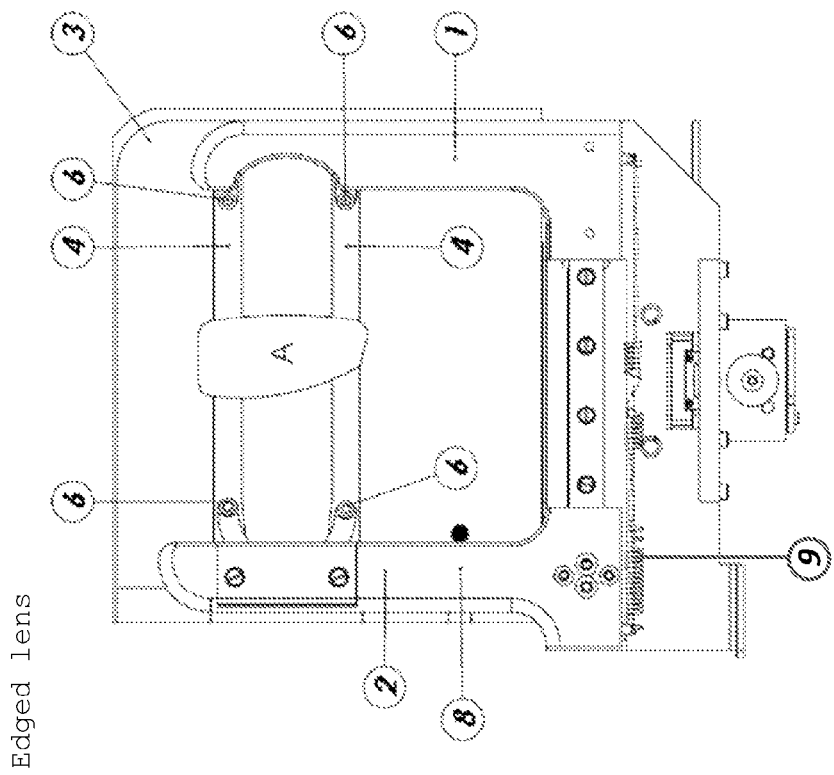
Figure 2A:
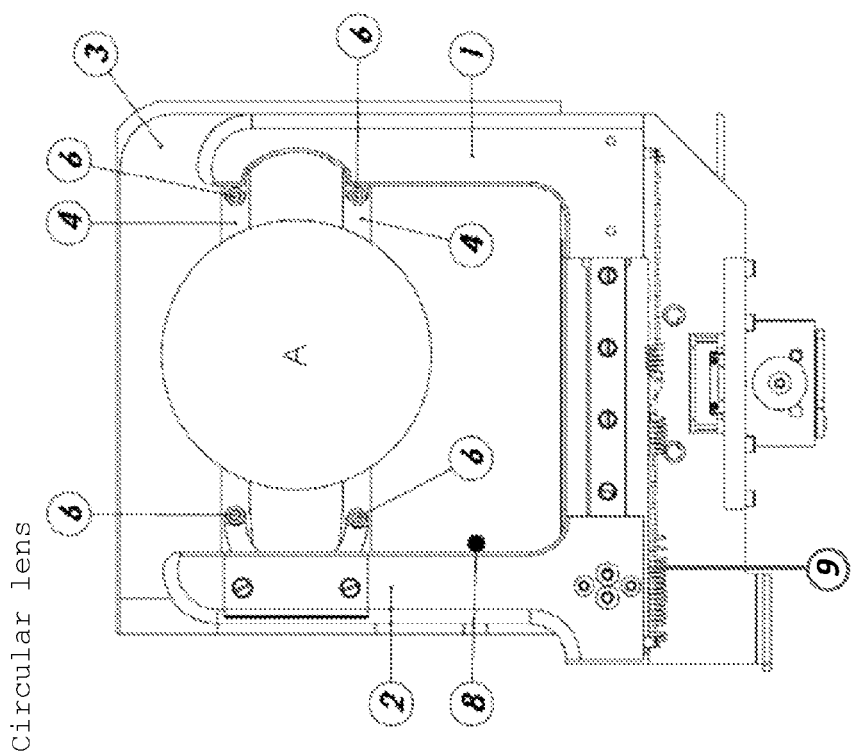

FIGS. 2a, b, c represent a preferred embodiment of an apparatus and a method for clamping and handling ophthalmic lenses according to the present invention, for a circular lens and an edged lens respectively. A detailed view of the arms-and-fingers grip system is shown on FIG. 2d (scale 2:1).

DETAILED DESCRIPTION OF THE INVENTION

An apparatus and a method, designed for clamping and handling ophthalmic (spectacle) lenses A with a large variety of lens shapes for many operations throughout the manufacturing process, are described below. The target is to move lenses, back and forth with one actuator 5 from a loading station to one or more functional stations.

The system is able to free both lens A surfaces for visualization, measurement, printing, engraving, . . . and to support the concave surface in reaction to a pressure applied on the convex surface during operations like pad printing, finishing block application, . . . .

The apparatus comprises a horizontal loading platform 3 onto which the lens A is laid down and supported with its concave surface downwards, and a grip composed of two arms 1, 2 for clamping the lens A on its edge. A first arm 1 is bound to the so-called main actuator 5 moving horizontally and a second arm 2 is guided in order to allow for a movement parallel to the actuator displacement 5. The grip system is independent of (i.e. not linked to) the platform 3. A means is used to attract the second arm 2 towards the first arm 1 to close the grip onto the lens A edge and another means 8 is used to block the second arm 2 at a fixed position to open the grip when the first arm 1 is moved to its rest position (FIG. 2a). In a closed grip, the lens A is hold between holding fingers 6 mounted on the arms. The fingers 6 are sliding partly along two or more parallel grooves 4 also parallel to the main actuator displacement 5. In order to grip a large variety of shapes, one arm is equipped with one fixed finger 6 and the other arm is equipped with two fixed fingers 6 or one arm is equipped with one fixed finger 6 and the other arm is equipped with a pair of fingers 6 moving with low friction according to their arm in opposite directions, or one arm is equipped with two fixed fingers 6 and the other arm is equipped with a pair of fingers 6 moving according to their arm in opposite directions. The closed grip can be moved to any station by at least one actuator(s) including the so-called main actuator 5.

The gripped lens A can be moved to stations where it is necessary to free both lens A surfaces for visualization, measurement, printing, engraving, . . .

A gripped lens A above its platform 3 is supported via the edges of the lens concave surface in reaction to a pressure applied on the convex surface. If needed, various horizontal platforms 3 designed in a similar way as the loading platform 3 can be positioned at various stations along the travel of the gripped lens A moved via the so-called main actuator 5 in order to support the lens A concave surface in reaction to a pressure applied on the convex surface during operations like pad printing, finishing block application, . . .

Additional actuators can be used to move the lens A grip onto the main actuator 5, or to move the main actuator 5 itself.

DESCRIPTION OF A PREFERRED EMBODIMENT (FIG. 2)

A preferred embodiment of the present invention is shown in FIG. 2. In the apparatus of FIG. 2, the first arm 1 is equipped with two fixed fingers 6 and the second arm 2 is equipped with a pair of fingers 6 moving according to their arm in opposite directions, being fixed on a chord of a circle freely rotating around its rotation center 7 in a fixed position according to the arm 2 (FIG. 2d). In this preferred embodiment, the means used to attract the second arm towards the first arm to close the grip is a spring (9).

In the configuration of FIG. 2a (open grip in its rest position), the lens can be either loaded onto the platform in its rest position or unloaded from the platform in its rest position.

As soon as the lens is loaded onto the platform, the fixed fingers 6 of the first arm 1 push the lens to the left. In its movement to the left, the lens pushes a first finger of the second arm 2 to the left leading to an opposite movement of the second finger of the second arm 2 to the right till both fingers 6 of the arm 2 get into firm contact with the lens A, closing the grip and clamping the lens A.

The configuration of FIG. 2b (closed grip) shows the clamped lens in the closed grip above the platform supporting the concave surface in reaction to any pressure applied on the convex surface during operations like pad printing, finishing block application, . . .

The closed grip can be moved by at least one actuator to any station equipped or not with a platform.

Figure 2C:
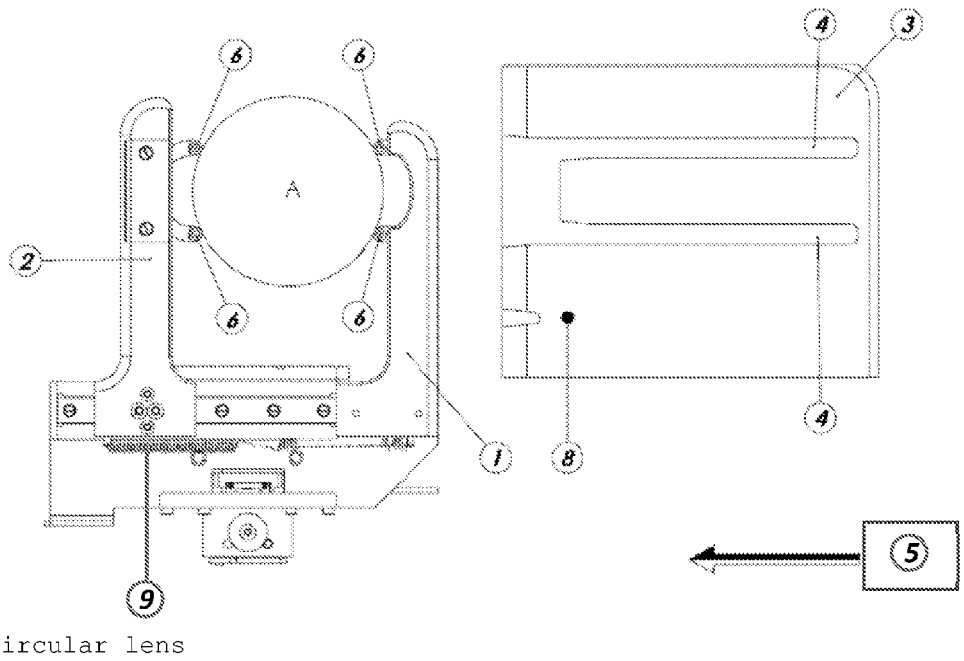
Figure 2C:
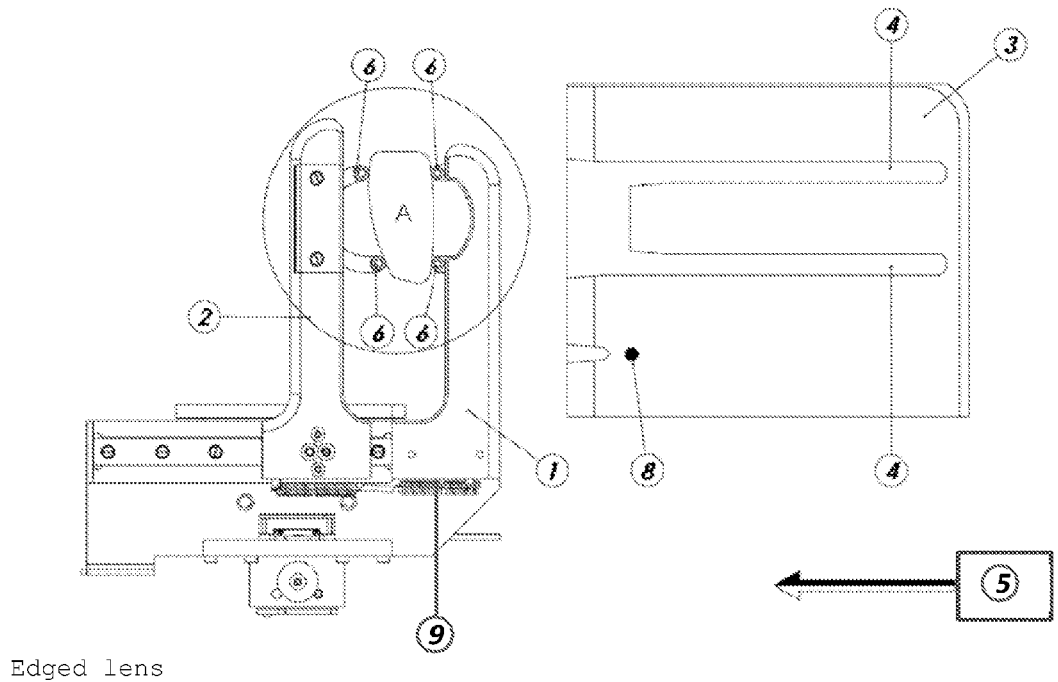
Figure 2D:
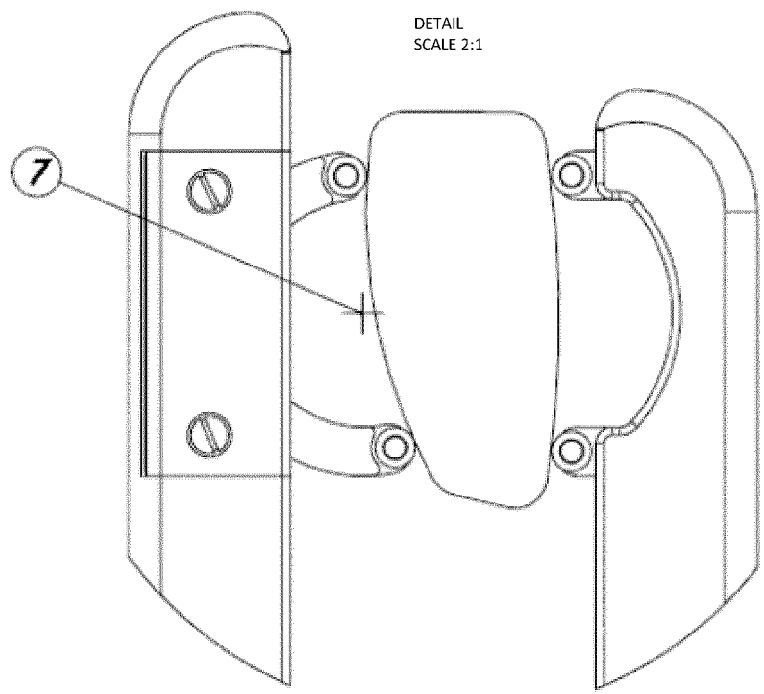
Figure 2D:
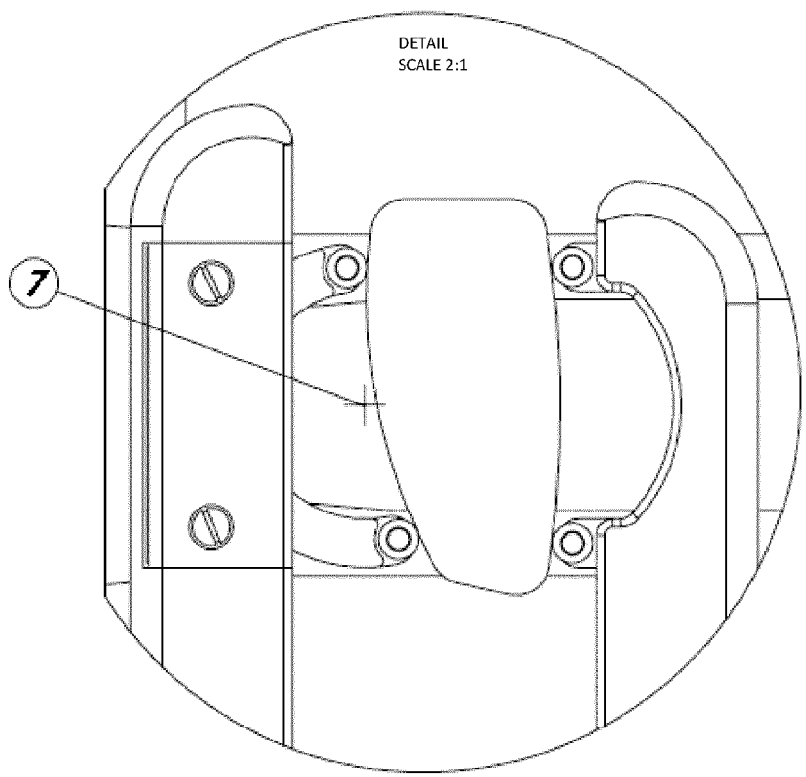

The configuration of FIG. 2c of the gripped lens A can be moved towards any station where it is necessary to get both lens A surfaces free for visualization, measurement, printing, engraving, . . .

The present invention has the advantage to provide the possibility of handling ophthalmic lenses in any position x, y, z and in any inclination.

The invention claimed is:

1. An apparatus for clamping and handling an ophthalmic lens (A) having an edge, a convex and a concave surface, in one or a plurality of stations throughout a manufacturing process, comprising:
    a main actuator (5);
    a loading platform (3) on which the lens is laid down with a lens concave surface downwards;
    a grip composed of two arms (1, 2) for clamping a lens edge, a first arm (1) being bound to said main actuator (5) and a second arm (2) being guided so that to allow for a movement parallel to the main actuator displacement;
    a first means for attracting the second arm (2) towards the first arm (1) to close the grip onto the lens edge;
    a blocking element (8) for blocking the second arm (2) at a fixed position when the first arm (1) is moved to a rest position so that to open the grip;
    holding fingers (6) mounted on at least one of the first arm (1) and the second arm (2) and partly sliding along parallel grooves (4) in said platform (3), said grooves (4) being also parallel to the actuator displacement.

2. The apparatus according to claim 1, characterised in that the main actuator (5) is moving horizontally, the loading platform (3) being horizontal as well.

3. The apparatus according to claim 1, characterised in that one of the first and second arms (1, 2) is equipped with one or two fixed finger and the other arm is equipped with a pair of fingers, either fixed or moving with low friction according to their arm in opposite directions.

4. The apparatus according to claim 1, characterised in that the main actuator (5) moves the lens (A) in the closed grip from a station to another.

5. The apparatus according to claim 3, characterised in that the two fingers (6) moving according to their arm in opposite directions are fixed on a chord of a circle freely rotating around a rotation centre (7) in a fixed position according to the arm.

6. The apparatus according to claim 1, characterised in that the first means for attracting the second arm (2) towards the first arm (1) to close the grip onto the lens is a spring (9).

7. The apparatus according to claim 1, characterised in that the arms (1,2) and fingers (6) support the gripped lens (A) above the loading platform (3) via the edges of the lens concave surface in reaction to a pressure applied on the lens convex surface.

8. Method for moving, clamping and handling an ophthalmic lens from a loading or functional station to another functional station or vice versa, using the apparatus as in claim 1, comprising at least the following steps:
    loading a lens (A) onto the platform (3) of a loading station in a rest position;
    clamping the lens (A) by pushing the lens thanks to at least one finger (6) of the first arm (1) in one direction, while the lens (A) is pushing at least one finger (6) of the second arm (2), till said at least one finger (6) of the second arm (2) gets into firm contact with the lens (A), closing the grip;
    moving the clamped lens (A) back and forth from the loading station to one or more functional stations or vice versa;
    returning to the loading station, unclamping the lens (A) in a rest position and unloading the lens from the platform (3) in its rest position.

9. The method according to claim 8, comprising the step of clamping the lens (A) by pushing the lens thanks to fixed fingers (6) of the first arm (1) in one direction, while the lens is pushing a first mobile finger (6) of the second arm (2) in the same direction, leading to a movement of a second mobile finger (6) of the second arm (2) in the opposite direction, till both mobile fingers (6) of the second arm (2) get into firm contact with the lens (A), closing the grip.

10. The method according to claim 9, characterised in that the two mobile fingers are on the first arm and the fixed fingers are on the second arm, ceteris paribus.

11. The method according to claim 8, characterised in that the lens is a semi-finished spectacle lens blank, a non-edged finished lens or an edged lens.

12. The method according to claim 8, characterised in that the lens diameter is comprised between 10 and 100 mm, the lens edge thickness is comprised between 0 and 30 mm and the lens centre thickness is comprised between 0.5 and 30 mm.

13. The method according to claim 8, characterised in that the lens has a convex front surface and a concave back surface, said surfaces being spherical, toric or having a form corresponding to an anisotropic curvature varying in a continuous or discontinuous way on a continuous or non continuous surface.

14. An Apparatus for clamping and handling an ophthalmic lens (A) having an edge, a convex and a concave surface, the apparatus comprising:
    one or more treatment stations throughout a manufacturing process, each station comprising:
    a main actuator (5);
    a loading platform (3) on which the lens is laid down with a lens concave surface downwards;
    a grip composed of two arms (1, 2) for clamping a lens edge, a first arm (1) being bound to said main actuator (5) and a second arm (2) being guided so that to allow for a movement parallel to the main actuator displacement;
    a first means for attracting the second arm (2) towards the first arm (1) to close the grip onto the lens edge;
    a blocking element for blocking the second arm (2) at a fixed position when the first arm (1) is moved to a rest position so that to open the grip;
    holding fingers (6) mounted on at least one of the first arm (1) and the second arm (2) and partly sliding along parallel grooves (4) in said platform (3), said grooves (4) being also parallel to the actuator displacement.

15. The apparatus according to claim 14, characterised in that the main actuator (5) moves the lens (A) in the close grip from the at least one treatment station to one or more of the treatment stations.

* * * * *